Dec. 19, 1939.   W. E. WOODARD   2,183,603
LOCOMOTIVE VALVE GEAR
Filed Feb. 19, 1937   3 Sheets-Sheet 1
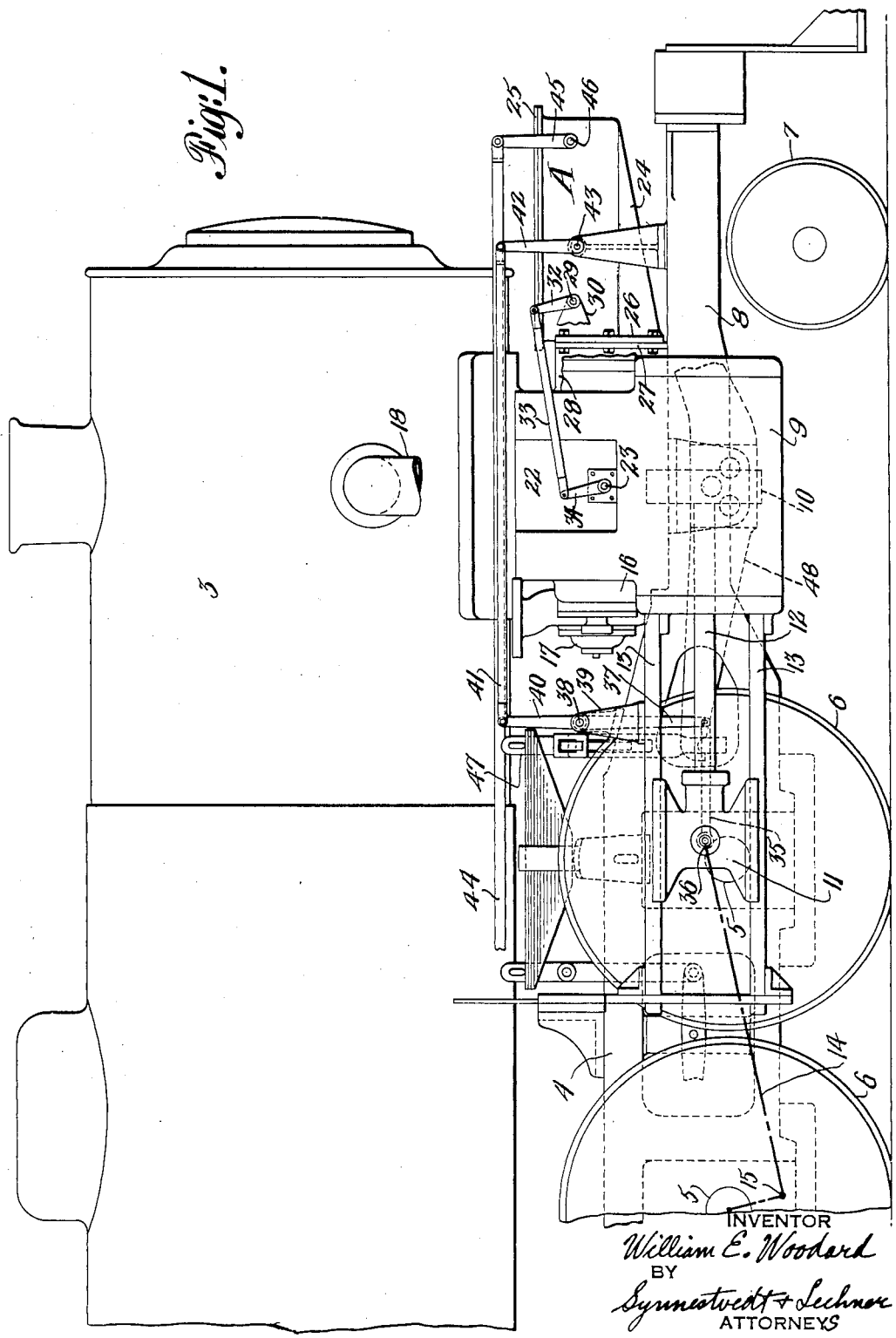
INVENTOR
William E. Woodard
BY
Synnestvedt & Lechner
ATTORNEYS

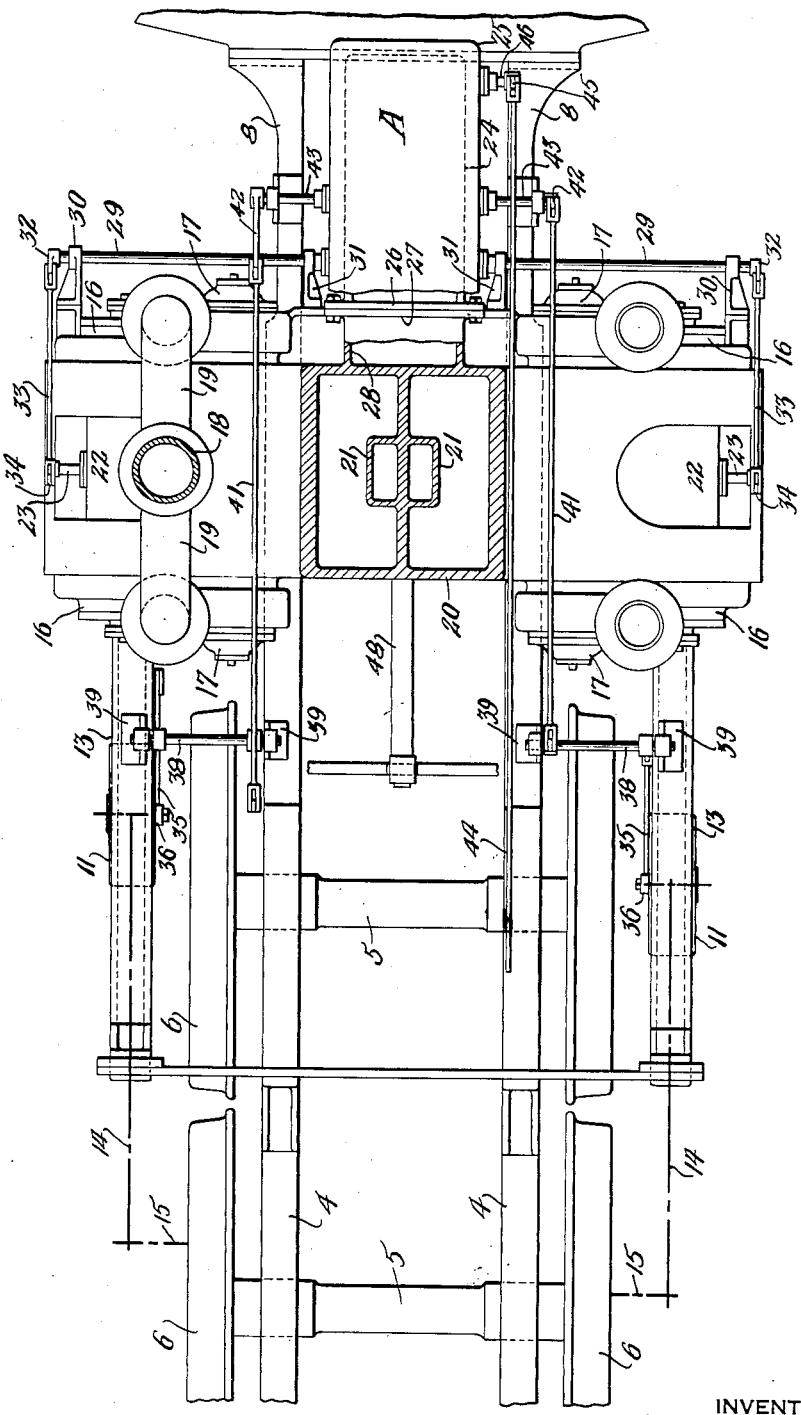

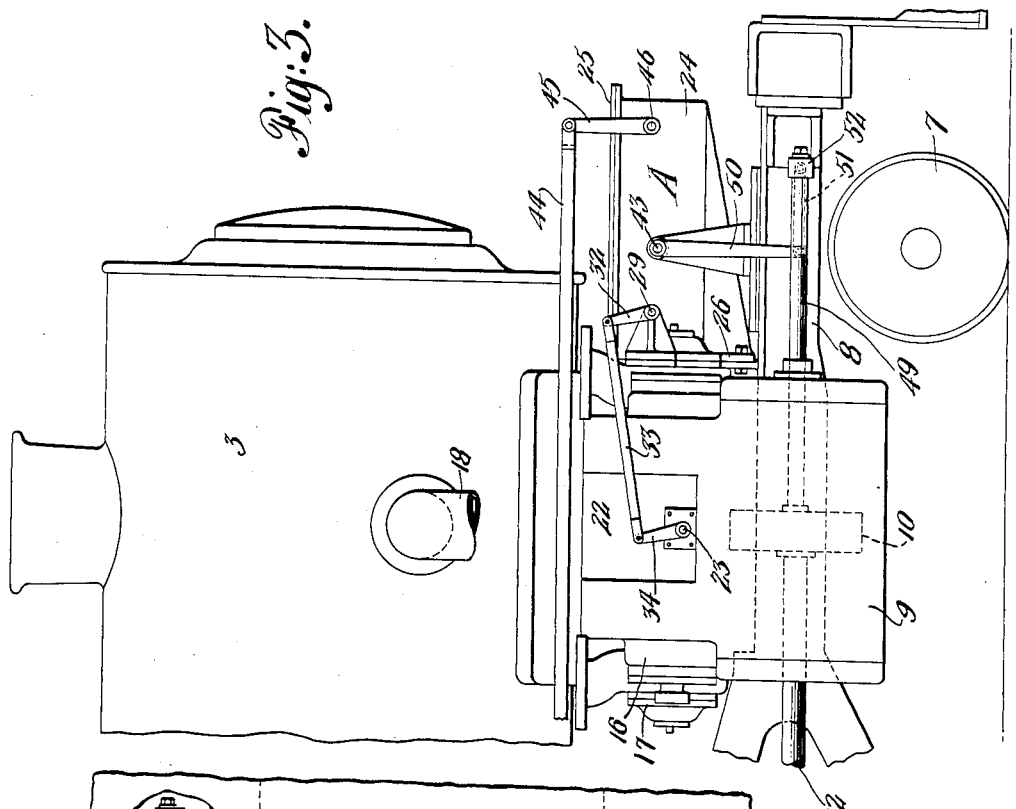

Patented Dec. 19, 1939

2,183,603

UNITED STATES PATENT OFFICE 2,183,603

LOCOMOTIVE VALVE GEAR

William E. Woodard, Forest Hills, N. Y.

Application February 19, 1937, Serial No. 126,587

17 Claims. (Cl. 105—37)

This invention relates to locomotive valve gear and is particularly concerned with an improved arrangement incorporating a variable cut-off valve gear mechanism for the steam distribution means of the cylinders, which mechanism is arranged as a compact unit mounted in the novel manner as hereinafter described.

One of the principal objects of the invention is to so arrange various parts of the valve gear, and especially the compact unit already mentioned, as to maintain various of the operating parts in strict or rigid alignment with each other.

The invention further has in view facilitating inspection, adjustment and replacement of valve gear parts, particularly the compact unit incorporating the variable cut-off valve motion mechanism, this end being achieved in large part by disposition of said unit in front of the cylinder saddle.

It is a further object of the invention to provide for ready removal and replacement of the compact unit and to so locate that unit as to leave better clearances for spring rigging, equalizing mechanism, brake hangers, etc., especially in a locomotive having a two-wheel leading or pilot truck, in which type the forward pair of drivers, and thus the spring rigging and the like, are positioned relatively close to the rear ends of the driving cylinders.

The foregoing objects and advantages and also others will be appreciated more fully after a consideration of the following description referring to the accompanying drawings, in which—

Figure 1 illustrates in side elevation the forward portion of a locomotive equipped with the improvements of this invention;

Figure 2 is a horizontal plan of the frame and running gear of the forward portion of the locomotive appearing in Figure 1, with certain parts in horizontal section, as will be mentioned more fully hereinafter;

Figure 3 is a fragmentary side elevational view, similar to Figure 1, of the forward portion of the locomotive embodying a modification of the arrangement shown in Figure 1; and Figure 4 is a fragmentary view similar to Figure 2 but illustrating the arrangement of Figure 3.

In the arrangement of Figures 1 and 2, the boiler is indicated at 3, and in these two figures the main longitudinal frame members are indicated at 4, these frame members being arranged to receive the several axles 5 of the driving wheels 6. As here shown, the locomotive is of the type employing a two-wheeled leading truck having wheels 7 located beneath the forward extensions 8 of the main frame members.

One of the driving cylinders appears at 9 in Figure 1, this cylinder having a piston 10 therein coupled with the crosshead 11 by means of piston rod 12. The crosshead 11 works between crosshead guides 13—13 and is coupled as by a main driving rod diagrammatically indicated at 14 with a crank pin 15 (also shown diagrammatically) of one of the main driving wheels.

While many features of the invention are applicable to steam distributing valves of various types, such as the piston and slide valve types, the invention is particularly suitable to valves of the poppet type, as in the embodiment shown, in which the poppet valves may be arranged in end-to-end relation in pairs enclosed within the valve chambers 16—16 and 17—17. As shown herein, the variable cut-off and reversing mechanism A for the valves is of the type disclosed in my copending application Serial No. 58,504, filed January 10, 1936, which has matured into U. S. Patent No. 2,136,405, granted November 15, 1938, although in said patent the arrangement of the valves themselves is such as to provide for movement of all of them on generally upright parallel axes.

As clearly seen in Figure 1, the valve chambers or chests 16 and 17 overlie the cylinders 9, those designated by the numeral 17 constituting the admission valves and the others (16) the exhaust valves. The admission chests at each side are supplied with steam from the boiler through the steam pipe 18 shown in horizontal section in Figure 2, and branch pipes 19 extended laterally therefrom and downwardly to the admission chests 17—17. The exhaust passages from the chests 16—16 are preferably disposed internally of the cylinder saddle 20, which may conveniently constitute an integral casting with the cylinders. As seen in Figure 2, the exhaust passages 21—21 extend upwardly through the saddle generally centrally thereof for ultimate delivery to the draft nozzle (not shown).

For the purpose of opening and closing the valves which are housed in the chests 16 and 17 for each cylinder, a cam mechanism may be employed, this mechanism being enclosed in a casing 22 and being operated by a rock shaft 23 projecting therefrom.

The rock shaft 23 of each cam mechanism is actuated by means of the variable cut-off valve motion mechanism mentioned above and generally indicated at A. The operating parts of this mechanism need not be considered in detail herein since they form no part of the present invention per se. These parts, however, are here shown as mounted in a casing 24, provided with a removable lid 25, the casing having a mounting flange 26 adapted to be bolted to a similar flange 27 formed on a projection 28 preferably cast integrally with the saddle 20. At each side, a rock shaft 29 projects from the casing 24, this shaft being provided with bearing supports 30 and 31, both of which are desirably carried rigid with the cylinder and saddle structure. At the outer end of each shaft 29 an arm 32 is provided, and this arm is coupled by link 33 with an arm 34 mounted on the cam actuating rock shaft 23.

In accordance with the patent hereinbefore referred to, the mechanism A is operated solely by connection with the crossheads 11. In the present improvement, however, the valve gear unit is located beyond the ends of the cylinders opposite to those ends where the crossheads are located. A link 35 is connected with the crosshead as at 36 and also with lever 37 keyed to the rock shaft 38 journalled by brackets 39. This rock shaft also carries an upwardly projecting arm 40 with which the connecting link 41 is coupled, the link extending forwardly, past the general transverse plane of the cylinders (as shown in Figures 1 and 2), for connection with arm 42 mounted on rock shaft 43 which projects into the casing 24.

The linkages just described are duplicated at opposite sides, although it is noted that the major operating parts for the valves of both cylinders are all housed within the common casing 24. Thus the major portion of the valve gear for controlling the operation of the valves for both cylinders is arranged as a compact unit A within the casing 24.

Reversing the operation of the valves and thus of the locomotive may be effected by means of the reach rod 44 extended forwardly from the cab and coupled with the arm 45 which is keyed to shaft 46 extended into the casing 24.

Referring to the modification of Figures 3 and 4, it is first pointed out that most devices and arrangements shown in these views are essentially the same as already described in connection with Figures 1 and 2, in view of which similar reference numerals have been applied to the parts.

However, in Figures 3 and 4, stems 49 extending out of the forward ends of the cylinders 9 from the pistons 10 therein, are employed as the driving or actuating means for the variable cut-off valve mechanism A. For this purpose rock shafts 43 which project into the casing 24 are provided with depending arms 50 which are coupled as by links 51 with a fitting 52 at the forward ends of the stems 49.

From the foregoing description of both forms, it will at once be noted that the variable cut-off valve mechanism and the valve means for the two cylinders are so arranged as to maintain strict and rigid alignment of the several operating parts, particularly the rock shafts and interconnecting links. The accuracy and rigidity of the alignment is in large part due to the fact that the cylinders, distribution valves, and the variable cut-off unit A are all immediately associated with and secured to the cylinder and saddle structure, which as already mentioned may desirably be cast integrally as a unit. In addition to this advantage, it is pointed out that because of the unitary and compact arrangement of the variable cut-off mechanism and the improved mounting thereof on the cylinder casting by means of the bolting flanges 26 and 27, the arrangement has the further advantage of maximum convenience in installation, inspection, repair and the like. Note for instance that the unit A may readily be removed and replaced by a substitute unit, merely by disconnecting a few links and removing the bolts securing the casing 24 to the saddle projection 28. It may also be observed that the arrangement is of convenience in initial erecting, or rebuilding, of locomotives, since the cylinder and saddle structure, together with the valves and the major valve motion parts may all be properly assembled and adjusted and thereafter brought to the locomotive as a unit for the final assembly work in the erecting shop.

While the foregoing advantages may be achieved even where the unit incorporating the variable cut-off mechanism is secured to the saddle structure in some other position than that shown, for example to the rear of the saddle (as may be permissible in some types of locomotives, especially where the forward driving wheels are spaced appreciably rearwardly of the cylinders) at the same time I have found the forward mounting of the unit A of particular advantage. This location materially facilitates inspection of the operating parts within the casing 24, the lid 25 thereof being readily accessible for removal. Still further, in various locomotives, especially a locomotive of the type illustrated (having a two-wheel pilot truck) in which the forward pair of drivers is located relatively close to the rear of the cylinders, the forward location of the unit A completely obviates space and interference difficulties. In a locomotive of the type shown, the spring rigging 47 and equalizing mechanism 48 (see Figure 1) and also the brake rigging (not shown) encroach substantially upon the space to the rear of the saddle 20 and thus would make application of the unit in this position relatively difficult, as compared to the forward location. On the other hand, in accordance with both of the arrangements shown, with the unit A located ahead of the saddle 20, the actuating connections for the valves are conveniently brought out laterally from each side of the casing 24 and thence rearwardly for coupling with rock shaft 23 in vertical planes adjacent the outer edges of the cylinders.

The arrangement of Figures 3 and 4, in which forwardly projecting piston stems are employed as the driving means for the variable cut-off mechanism, is of especial advantage since all of the valve gear operating connections (with the exception of the reach rod 44) are located for most convenient access at the forward end of the locomotive. This factor is of importance when considering matters of inspection, installation, and replacement of parts, such as the valve mechanism unit A.

I claim:

1. In a locomotive having a boiler, cylinders, smoke-box and framing, a box-like saddle structure mounted to occupy the space between said cylinders, and rigidly interconnecting said cylinders, smoke-box and framing, and thus supporting said boiler, steam distribution valve means for each cylinder, a valve motion mechanism for actuating the valve means of both cylinders, the said mechanism being arranged as a compact unit removably secured to the saddle structure between the planes of the cylinders.

2. In a locomotive having cylinders, an associated saddle structure, and steam distribution valve means for each cylinder, a variable cut-off valve motion mechanism for actuating the valve means of both cylinders, the said mechanism being arranged as a compact unit, and means removably securing said unit to an upright wall of the saddle structure in position to extend generally horizontally therefrom.

3. In a locomotive having cylinders, a box-like boiler-supporting saddle structure mounted to occupy the space between said cylinders, and steam distribution valve means for each cylinder, a valve motion mechanism for actuating the valve means of both cylinders, the said mechanism including actuating parts for the valve means of both cylinders arranged as a compact unit and being provided with a casing removably secured to the saddle structure substantially in the horizontal plane thereof.

4. In a locomotive having cylinders, an associated saddle structure, and steam distribution valve means for each cylinder, a variable cut-off valve motion mechanism for actuating the valve means of both cylinders, the said mechanism being arranged as a compact unit mounted at the front side of the saddle structure, and the mechanism further having valve actuating connections extended transversely of the locomotive in positions ahead of the cylinders and thence rearwardly for connection with the steam distribution valve means.

5. In a locomotive having cylinders, an associated saddle, and steam distribution valve means for each cylinder, an actuating member for the valve means of each cylinder positioned respectively adjacent the outer edges of the cylinders, a variable cut-off valve motion mechanism for actuating the valve means of both cylinders, the said mechanism being arranged as a compact unit mounted at the front side of the saddle, and the mechanism further having valve actuating connections extended transversely of the locomotive in positions ahead of the cylinders and thence rearwardly for connection with said actuating members.

6. In a locomotive having cylinders, an associated saddle structure, and steam distribution valve means for each cylinder, a variable cut-off valve motion mechanism for actuating the valve means of both cylinders, the said mechanism including actuating parts for the valve means of both cylinders arranged as a compact unit and a casing for said parts removably secured to the saddle structure at the forward side thereof.

7. In a locomotive having main, longitudinal framing, a pair of cylinders and steam distribution valve means for each cylinder, a box-like boiler-supporting saddle structure mounted to occupy the space between the cylinders and having a valve gear mechanism support formed integrally therewith, a compact valve gear unit with connections extending therefrom for actuating the valve means of both cylinders, and means removably securing said unit on said support in a plane intermediate the sides of said main, longitudinal framing.

8. In a locomotive having a pair of cylinders and steam distribution valve means for each cylinder, a saddle associated with the cylinders and having a valve gear mechanism support formed integrally therewith and projecting from the forward side of the saddle, a variable cut-off valve gear mechanism for actuating the valve means of both cylinders, the valve gear mechanism including actuating parts for the valve means of both cylinders arranged as a compact unit and a casing for said parts removably secured to said support and projecting forwardly therefrom substantially in the horizontal plane of the saddle.

9. In a locomotive of the type having driving wheels and a two-wheel pilot truck with a pair of cylinders located longitudinally between the pilot truck and the forward driving wheels and relatively close to the latter, steam distribution valve means for each cylinder, and a variable cut-off valve motion mechanism incorporating actuating parts for the valve means of both cylinders arranged as a compact unit, and means for supporting said unit in a position ahead of a transverse vertical plane adjacent the forward ends of the cylinders.

10. In a locomotive of the type having driving wheels and a two-wheel pilot truck with a pair of cylinders located longitudinally between the pilot truck and the forward driving wheels and relatively close to the latter, a saddle associated with the cylinders, steam distribution valve means for each cylinder, a variable cut-off valve motion mechanism for actuating the valve means of both cylinders, the said mechanism including actuating parts for the valve means of both cylinders arranged as a compact unit and a casing for said parts removably secured to the saddle at the forward side and substantially in the horizontal plane thereof.

11. In a locomotive having cylinders, smoke-box and framing, a box-like boiler-supporting saddle structure rigidly interconnecting said cylinders, smoke-box and framing, and steam distribution valve means for each cylinder, a variable cut-off valve motion mechanism for actuating the valve means of both cylinders, the said mechanism including actuating parts for the valve means of both cylinders, and a casing for said parts, the casing and the parts therein being arranged as a compact separately-handleable unit removably secured to the saddle structure.

12. In a locomotive having cylinders, pistons, with piston rods extended rearwardly therefrom, a saddle structure associated with the cylinders, and steam distribution valve means for each cylinder, a variable cut-off valve motion mechanism for actuating the valve means of both cylinders, said mechanism being mounted on the saddle structure at the forward side thereof, stems projecting forwardly from the pistons out of the cylinders, and means for actuating said variable cut-off valve motion mechanism comprising linkage extended therefrom and connected with said stems.

13. In a locomotive having cylinders, pistons, with piston rods extended rearwardly therefrom, a saddle structure associated with the cylinders, and steam distribution valve means for each cylinder, a variable cut-off valve motion mechanism for actuating the valve means of both cylinders, said mechanism being arranged as a compact separately-handleable unit mounted on the saddle structure at the forward side thereof for ready access at the front of the locomotive, stems projecting forwardly from the pistons out of the cylinders, and means for actuating said variable cut-off valve motion mechanism comprising linkage extended therefrom and connected with said stems.

14. In combination, a locomotive engine casting including a pair of cylinders, a separately formed valve gear housing adapted to enclose the valve gear for both said cylinders and arranged as a single, compact unit having mounting means, actuating connections from the valve gear unit to the valves, and a mounting seat integral with the engine casting and configured to cooperate with said mounting means to support said valve gear housing, whereby fixed alignment of said cylinders, housing and connections is assured.

15. In combination, a locomotive engine casting including a pair of cylinders and a saddle, a separately formed valve gear housing common to the valve gear for both said cylinders and having mounting means, and a mounting bearing integral with and formed directly upon the saddle portion of the casting and configured to co-operate with said mounting means to support said valve gear housing, whereby fixed alignment of said cylinders, valve gear, and valve gear housing is assured.

16. In a locomotive having cylinders, an associated saddle structure, and steam distribution valve means for each cylinder, a variable cut-off valve motion mechanism for actuating the valve means of both cylinders, the said mechanism being arranged as a compact unit mounted on the saddle structure at the front side thereof, and the mechanism further having valve actuating connections extended transversely of the locomotive in positions ahead of the cylinders and thence rearwardly for connection with the steam distribution valve means.

17. In a locomotive having wheels, cylinders, pistons and crossheads connected to drive said wheels, steam distributing valve means for each cylinder, valve motion mechanism for actuating the valve means of the cylinders arranged as a compact unit and located beyond the ends of the cylinders opposite to those ends where the crossheads are located, connections to said valve motion mechanism from each crosshead, passing across a general transverse plane at the cylinders, and connections from said valve motion mechanism to said valve means, whereby to give ready access to said mechanism and to minimize interference with the locomotive running gear.

WILLIAM E. WOODARD.